Oct. 30, 1962  S. J. LEVENSON  3,060,559
BEARING REMOVER HAVING AXLE HOLDING REACTION MEMBER
Filed Aug. 27, 1959
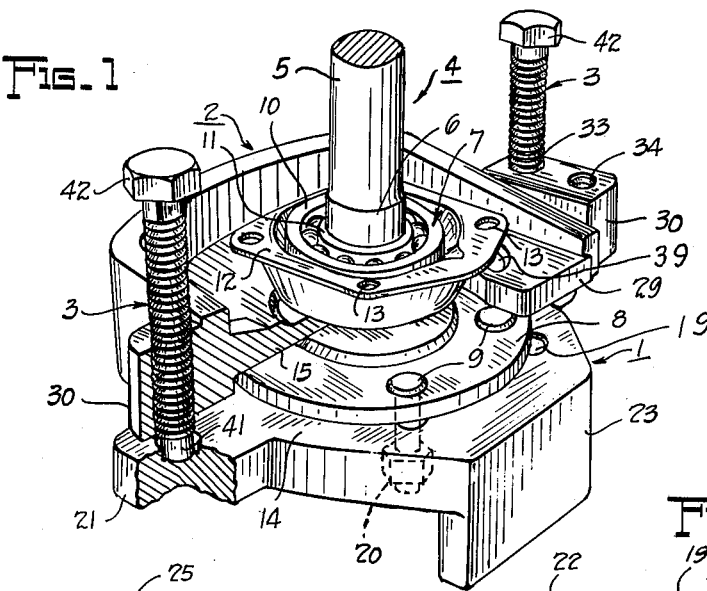
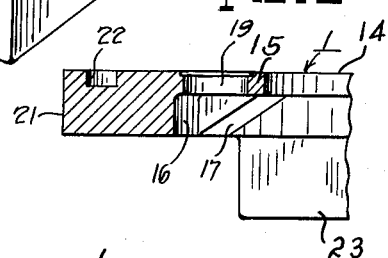
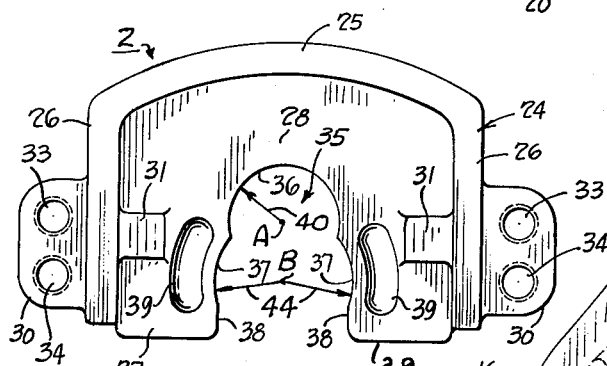
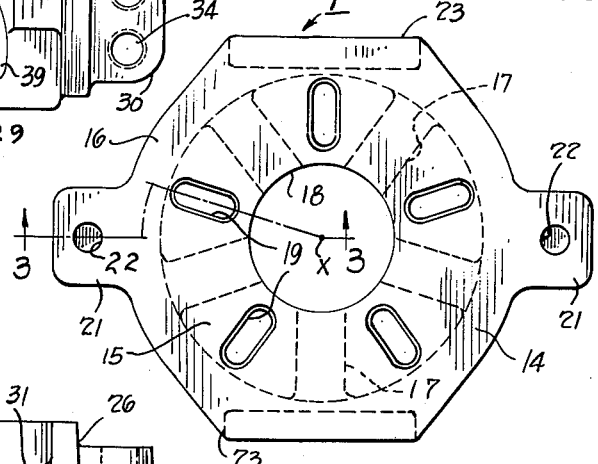
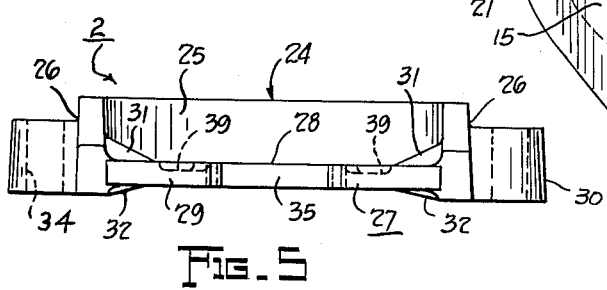
INVENTOR.
SOL J. LEVENSON
BY Bosworth, Sessions
Herrstrom and Knowles
ATTORNEYS.

United States Patent Office 3,060,559
Patented Oct. 30, 1962

3,060,559
BEARING REMOVER HAVING AXLE HOLDING
REACTION MEMBER
Sol J. Levenson, 2641 Idlewood Ave.,
Cleveland Heights, Ohio
Filed Aug. 27, 1959, Ser. No. 836,463
6 Claims. (Cl. 29—256)

This invention relates to mechanical tools and is particularly concerned with a specialized bearing removing device that is compact and low-priced and can be readily, easily and conveniently used by any automobile mechanic for the purpose of disassembling a bearing unit from the drive axle on which it is press fitted.

Modern automotive vehicles have divided rear drive axles, the two axle halves each extending outwardly from the differential to which the inner ends of the axles are drivingly connected. The drive axles are enclosed in tubular housings fast at their inner ends to a housing that encloses the differential. At their outer ends the tubular housings are bored to receive the outer races of ball or roller bearings; the inner races of the bearings are press fitted on the drive axles adjacent the outer ends of the latter. The drive axles terminate in circular axle end plates disposed outside and beyond the extremities of said tubular housings. The brake drums and wheels of the vehicle are attached as by bolts or studs to such axle end plates. Closure elements or caps for the tubular housings are located between the axle end plates on the drive axles and the bearing units, and the outer ends of the drive axles project through apertures in such closure elements. The latter are fastened as by screws to and over the outer ends of the tubular axle housings. The bearing units or the closure elements carry oil seals which either confine lubricant to the space between the bearing races or prevent lubricant flowing outwardly along the drive axles to the bearings from passing the bearing units and escaping out the axle housings through the openings in the closure elements.

Considerable difficulty has been experienced in removing the bearing unit of such an axle assembly from the cylindrical bearing receiving portion of the axle on which the inner race is press fitted. Such disassembly is required to replace either the bearing or the lubricant seal should one of these parts become damaged or worn. Various procedures have been used to force the press fitted bearing units off the axles, including prying with levers and fixturing in arbor presses. The former is objectionable in that it is uncertain and dangerous; the latter is costly and cumbersome.

It is therefore the principal object of the present invention to provide a simple and inexpensive tool for removing a bearing unit from such an axle assembly, which tool is small and compact, can be easily carried about in the tool kit of an auto mechanic and is safe and easy to operate. More particularly, the invention provides a tool for removing the bearing of such an axle assembly, which tool is in the form of a lifting member adapted to be inserted between the axle end plate and the bearing in straddling relation to the axle and which carries screw means adapted to react against a companion reaction member to which the end plate is made fast. The organization functions in such a way as to urge the lifting member upward against the bearing unit and force it off the axle without destroying it and with minimum danger from flying fragments of bearing races or the like.

According to the preferred version of the invention, the tool incorporates a reaction member to which the end plate of the axle assembly is clamped as by the bolts carried by the plate for attachment of the vehicle wheel. The reaction member is adapted to accept a wide variety of axle assembly end plates, and has outrigger pressure receiving portions disposed beyond the periphery of the end plate. The companion lifting member comprises a relatively thin flat web having a lateral slot opening through an unobstructed wide forward edge to receive the portion of the axle between the axle end plate and the closure element. The lifting member bears against the closure element and carries a pair of screws located on opposite sides of the slot and adapted to be actuated in unison to apply against the outrigger portions of the reaction member an axial thrust which forces the bearing unit off the axle.

As another object of the invention and as a refinement thereof, the reaction member is of strong, light weight construction, having a working center and a peripheral force-transmitting rib. The outrigger pressure portions of the reaction member are fixed to the peripheral rib and the reaction member includes a relatively thin base portion connected by transverse ribs to said circumferential rib. Such base portion has spaced radially elongated openings through which extend bolts that are fixed to the end plate of the axle assembly. Thus the latter is firmly clamped to said reaction member and the elongated character of the bolt openings permit location of the axle with its axes at said working center of the reaction member.

As another object and as a further refinement of the invention incorporated in the preferred embodiment, the lifting member is so constructed as to be strong and light. It comprises a yoke-shaped reinforcing rib which is continuous about the major portion of the periphery of said lifting member but is discontinuous across its front or forward end. The rib supports between the sides and rear thereof a relatively thin web portion having a forward edge, through which the axle receiving slot opens, located at the open end of the yoke-shaped rib. Transverse reinforcing ribs are anchored to and extend between the yoke-shaped rib and said web portion to strengthen it.

Another object of the invention is to provide such a tool which is adapted to remove bearing units from a wide variety of axle assemblies, including those for certain automobiles in which the axle closure elements have raised protuberances thereon adjacent the opening through which the axle passes. As a refinement of the invention, therefore, the web portion of the lifting member is provided with a slot having two operative portions: a narrower rearward or terminal portion defined by an arcuate internal edge portion of the lifting member, and a wider forward portion defined by spaced confronting concave arcuate edge portions of the lifting member, such forward portion merging with the narrower portion of the slot. The reaction elements for applying bearing removing forces between the companion members are arranged for engagement with the lifting member in two different, predetermined positions: one for use when the bearing being removed is centered in the rearward portion of the slot, the other for use when such bearing is centered in the forward portion of the slot. Formed in the web portion adjacent to the slot may be depressions adapted to receive and clear the above mentioned protuberances on the closure elements of certain axle assemblies.

Other objects and advantages relate to certain novel features of construction and combinations of parts apparent in the following detailed description of a preferred embodiment which represents the best known mode of practicing the invention. This description is made with reference to the accompanying drawings forming a part of the specification.

In the drawings:

FIG. 1 is a perspective view partly in section and with parts broken away and removed showing the bearing removing device of the present invention applied in operative position to a standard rear axle assembly that has been removed from a conventional automotive vehicle;

FIG. 2 is a top plan view of the reaction member of the device of FIG. 1;

FIG. 3 is a sectional detail, substantially along line 3—3 of FIG. 2;

FIG. 4 is a top plan view of the lifting member of the device of FIG. 1; and

FIG. 5 is a front elevation of the lifting member of FIG. 4.

The bearing removing device or tool shown in the drawings comprises a reaction member 1, a lifting member 2, and actuating screws 3 for thrusting lifting member 2 away from reaction member 1. In FIG. 1, the device is shown applied to a standard rear drive axle assembly 4 of an automotive vehicle, in readiness to perform the bearing removing operation for which it is intended. The axle assembly 4 comprises the axle proper, which includes an elongated drive portion 5, most of which is broken away and removed in the drawing, a cylindrical bearing receiving portion 6 on which is mounted a bearing unit 7, and, permanently and rigidly attached to the end of the axle, a circular end plate 8 having a plurality of threaded studs 9, one of which is shown in dotted lines, by means of which a wheel and/or brake drum may be fixed to the axle assembly. The studs are parallel to one another and to the axis of the axle and are equi-angularly spaced about a circle centered on such axis. The drive portion 5 of the axle is generally of slightly smaller diameter than the cylindrical bearing receiving portion 6. In the vehicle, but not shown, the drive portion 5 and the cylindrical bearing receiving portion 6 are enclosed in a tubular housing and the drive portion extends to the differential gearing, to which it is drivingly connected as by a splined joint. The outer end of such tubular housing is bored to accommodate outer race 10 of the bearing unit 7 that also includes inner race 11 and a number of ball or roller bearings. A closure element 12 is located on the axle between the bearing unit and the end plate 8, this closure element being formed with a central opening through which the axle is received and extends to the end plate 8. The closure element 12 takes different forms in different automobiles, but customarily has a number of marginal openings 13 to receive screws for securing the closure across the end opening of the tubular axle housing. To prevent lubricant from escaping, an annular oil seal, not shown, may be carried by the closure element 12 or located between the bearing races as part of the bearing unit.

In original assembly, inner race 11 of the bearing unit 7 is press fitted onto the cylindrical bearing receiving portion 6 of the axle, being located against a radial shoulder and often having adjacent thereto a retainer ring also press fitted onto the axle portion 6. In field servicing of the axle assembly, as in replacing the oil seal or bearing unit, the exerting of an axial load on the bearing unit 7 sufficient to force the inner race 11, and bearing retainer if present, off the cylindrical portion 6 of the axle heretofore usually presented a difficult problem to the ordinary garage mechanic. Common procedure has been to fracture the bearing races to facilitate their removal. This is objectionable since, in many cases, only the oil seal is defective, yet the fracturing of the bearing races in their removal necessitates their replacement as well as that of the oil seal. Furthermore, the fracturing of the bearing races is a dangerous procedure; the mechanic may be injured by shrapnel-like fragments of a shattering race.

As is shown to advantage in FIGURES 1, 2 and 3, the reaction member 1 of the illustrated device has no moving parts and may be formed in one piece of cast or forged steel or may comprise an assembly of welded steel parts. It has a flat, upper supporting surface 14 against which bears the end plate 8 of an axle assembly; and it comprises a generally flat, relatively thin base portion 15 preferably of generally circular configuration having a relatively deep, massive circular reinforcing rib 16 fixed thereto about the entire periphery of the base portion and located wholly below the reaction surface 14. A plurality of transverse radially extending tapered reinforcing ribs 17 are connected at their outer ends to the inwardly directed face of said circumferential reinforcing rib 16 and all along their lengths as far as center opening 18 to the underside of the base portion 15. The base portion 15 has openings therein to receive and provide clearance for projections from the end circular plate 8 of the axle assembly; thus, said base portion 15 has the centrally located circular opening 18 the center of which constitutes the work center X of the reaction member, and a plurality of radially elongated slots 19 angularly spaced about and equidistant from said center and passing through the base portion 15 between the ribs 17. The central opening 18 is large enough to receive and clear any central projection from end plate 8, such as a projecting end of the axle; and radial slots 18 are located to receive and clear studs 9 fixed to said end plate, or to match and align with holes in the end plate 8 to receive suitable through bolts. By means of nuts 20 on the threaded studs 9 on the end plate 8, as shown in dotted lines in FIG. 1, or by means of through bolts in holes provided in such end plate, the end plate can be securely clamped to and centered on the reaction member 1 preparatory to the bearing removal operation.

The reaction member 1 also comprises spaced pressure portions at or on outrigger elements protruding radially from its periphery and adapted to receive the pressure of the actuating screws 3. In the illustrated device, the pressure portions take the form of two diametrically opposed lugs 21 projecting radially outwardly from and fixed to the circumferential reinforcing rib 16. Each of said lugs has a socket 22 therein, to receive and locate the end of one of the actuating screws 3 as will later be described, such sockets being located beyond the periphery of any axle assembly end plate which may be mounted on reaction member 1, the axes of said sockets 22 being equidistant from and lying in the same plane as one another and the work center X of the reaction member 1.

The illustrated reaction member 1 also comprises two downwardly extending diametrically opposite leg portions 23 fixed to the rib 16, and serving to support the entire device with the base portion 15 spaced above and in parallel relation to a supporting surface sufficiently to clear any clamping bolts or nuts holding the end plate 8 of the axle assembly to the surface 14 of the reaction member 1 and to clear any central projection of the axle assembly, and serving to provide means whereby the reaction member 1 and hence the whole device may be clamped in a bench vise or the like during use.

The reaction member 1 shown is designed so that the massive circumferential rib 16 is thus a force-transmitting member, operating to receive the downward thrust of the actuating screws 3 on pressure portions 21 fixed to the rib, and to distribute the force of such thrust in resisting the lifting force on the circular rib resulting from upward pulling of the end plate 8 of the axle assembly clamped to the surface 14, which lifting force is transmitted by the base portion 15 and the radial ribs 17 to the reinforcing rib 16.

The structure of the main or lifting member 2 is apparent from FIGURES 1, 4 and 5. It is suitable for one piece integral construction, being preferably formed of cast or forged steel, although it may also be made up of welded steel parts. It comprises a massive yoke-shaped reinforcing rib portion or peripheral rib 24 comprising rear portion 25 and side portions 26, surrounding on three sides or edges the major portion of the periphery of the member 2, but being open at a fourth side or edge of such member. Fixed to and suported by such rib 24 is a flat, relatively thin web or body portion 27 extending between the rear portion 25 and side portions 26 of rib 24, and having a top surface 28 providing a working area. As is shown in FIGURE 1, the rear portion 25 of the reinforcing rib 24 is of generally greater height than the side portions 26, the latter portions tapering from the height of the rear portion to a minimum height adjacent the fourth or forward edge 29 of the lifting member 2. The greater portion of the yoke-shaped reinforcing rib 24 is located above the top surface 28 of the web portion 27 to facilitate placement of the device with the relatively thin web portion 27 disposed between the end plate 8 and the closure element 12. Transverse tapering reinforcing ribs 31 and 32 respectively located above and below the web portion 27, connect side areas of the web portion 27 to the side portions 26 of the rib 24, thus providing added strength and resistance to deflection at points of maximum stress.

A pressure-transmitting outrigger lug 30 constituting a reaction portion of the main lifting member 2 is fixed to and projects outwardly from the outside of each side portion 26 of the rib 24. The transverse ribs 31, 32, and the lug 30 at each side of the lifting member 2 are located essentially opposite each other and on opposite sides of the corresponding side portion 26 of the rib 24, to provide stress distribution and strength for resistance to forces between the web portion 27 and the lugs 30. Each of said reaction portions or pressure-transmitting lugs 30 has two threaded holes 33 and 34 therein, for reasons to be described later.

Opening through the forward edge 29 of the lifting member 2 is a slot, generally indicated by reference numeral 35. Such slot has two portions; a narrower rear portion and a wider front portion. The rear portion is defined by an arcuate edge wall 36 closing the end of the slot and having a rear center A of radius 40 which locates the edge wall 36. The center A lies in a plane containing the axes of the rear threaded openings 33 in the side outrigger lugs 30. The wider front portion of the slot is defined by two confronting concave arcuate edge wall portions 37 at the sides of the slot terminated rearwardly by intersection with the arcuate wall 36 of the narrower portion of the slot and forwardly by intersection with spaced confronting parallel walls 38 which define a slot width somewhat narrower than the maximum width defined by the arcuate wall portions 37 of the slot. The arcuate wall portions 37 are arcs of a common circle of radius 44 larger than radius 40 and having its front center B lying in a plane containing the axes of the front threaded openings 34 in lugs 30.

As shown in FIGURES 4 and 5 the web portion 27 of the lifting member 2 has two generally arcuate elongated depressions 39 formed in its top surface 28. The sides of said depressions are shown as arcs of circles having the same center B as the arcuate wall portions 37 of the slot 35. These depressions are designed to receive and clear protuberances on the outer surface of the closure elements 12 of certain automobiles, so that when the top surface 28 of the web portion 27 of lifting member 2 bears against such a closure element in removal of a bearing unit from an axle assembly, contact occurs and is distributed over a relatively large area of the closure element and is not localized on such protuberances.

The lower or thrust end of each of the actuating screws 3 is formed with a reduced diameter cylindrical portion 41 adapted to fit relatively closely and rotate in a locating socket 22 of one of the pressure-receiving lugs 21 of the base member 1; the upper or drive end of each of said screws is of non-circular cross section, such as the hexagonal head 42, to facilitate turning as by a ratchet wrench or other suitable implement.

In use of the illustrated device embodying this invention, the end plate 8 of the axle assembly 4 from which a bearing unit and/or oil seal is to be removed, is first placed on the supporting surface 14 of the reaction member 1, with its projecting studs and central axle portion, if any, respectively located in the radial slots 19 and the central opening 18 of the base portion 15, and with the axis of the axle aligned as closely as conveniently possible with the axis X of the central opening 18 constituting the work center of the reaction member 1. The end plate 8 is then clamped to the reaction member 1, preferably by applying nuts 20 to the ends of any threaded studs 9 on said end plate 8 projecting through the radial slots 19 in the base portion 15 of the member 1 and tightening such nuts against the bottom of said base portion 15; or, if said end plate is of the type which has no threaded studs but has threaded holes adapted to receive bolts, then by inserting bolts through the radial slots 19 in the base portion 15 of the member 1 into said threaded holes in the end plate 8, and tightening them against the bottom of the base portion 15. The spaces between the transverse ribs 17 are great enough to permit the convenient use of wrenches to tighten such nuts or bolt heads.

The lifting member 2 is then inserted between the end plate 8 and the closure element 12 of the axle assembly, with the slot 35 of the web portion 27 of the lifting member 2 receiving the portion of the axle between the end plate 8 and the closure element 12.

Depending on the type of axle assembly to be operated on, the lifting member 2 and the axle are so positioned relative to each other that the axis of the axle may be located either at approximately the center A of the narrower rear portion of the slot 35 or at approximately the center B of the wider front portion of the slot. The choice of positions, of course, will depend on the diameter of the portion of the axle to be contained in the slot and the presence or absence of protuberances on the closure element 12 requiring clearances provided by the depressions 39. Preferably, if the above factors permit, the axle is disposed in the narrower A center portion of the slot 35, since bearing areas closer to the working center will then be provided on closure element 12 by those portions of the top surface 28 of the web portion 27 in the vicinity of the slot.

With the lifting member thus properly positioned in straddling relation to the axle shaft, the actuating elements or screws 3 are threaded into the pair of holes 33 or the pair of holes 34, the holes selected being those whose axes lie substantially in the plane of the axis of the axle, depending on the location of such axis at either center point A or B proper for the particular axle. The cylindrical portions 41 at the lower ends of the actuating screws 3 are inserted into the sockets 22 of the lugs 21 of the reaction member 1. Such location of the screw end portions 41 in socket 22 serves to locate properly the reaction member 1 of the axle assembly 4 in predetermined position relative to the lifting member 2 and the closure element 12 of the axle assembly, for uniform and effective lifting action along a predetermined axis.

The actuating screws 3 may then be turned, either by the fingers or by a suitable wrench, until the top surface 28 of the web portion 27 of the lifting member 2 engages the underside of the closure element 8 of the axle assembly 4. The screws 3 are then further rotated in substantial unison, as by ratchet wrenches (not shown) applied to the drive ends 42 of the screws and actuated simultaneously by a mechanic holding one of the ratchet wrenches in each hand. As the screws are thus turned, the lower end portions 41 of the screws, in the sockets 22 of pressure receiving lugs 23, thrust against the reaction member 1. Lifting member 2 is consequently forced upwardly and away from the reaction member 1, by reaction of the threaded lugs thereof in engagement with the screws 3 and transmitting the lifting forces to the reinforcing rib 24, and from such rib to the web portion 27, the transverse ribs 31 and 32 aiding in distribution of the stresses. As the screws are further turned in unison, pressure of the lifting member 2 against the closure element 12 forces the bearing unit 7 and any retainer upwardly and off the cylindrical bearing securing portion 6 of the axle.

Uniform seating of the closure element 12 against the upper surface 28 of web portion 27 is assured for several reasons. If there are protuberances on the closure element as in axle assemblies of certain automobiles, clearance is provided for them by the arcuate depressions 39.

Because of the location of the actuating screws 3 in either the rear pair of threaded holes 33 or the forward pair of threaded holes 34, depending on the location of the axle relative to the lifting member 2 as described above, and since the lower ends 41 of the screws 3 are located in the sockets 22 which have their axes equidistantly and diametrically located from the work center X of the reaction member 1 with which the axis of the axle substantially coincides, the axes of both of the actuating screws 3 and the axis of the axle all lie in substantially the same plane during the lifting or bearing removing operation. Thrust reaction forces between the reaction member 1 and the lifting member 2 are thus balanced and provide uniform, evenly distributed lifting forces on the lifting member 2 and the closure element 12. The lifting forces acting on the bearing unit 7 itself therefore are also balanced or evenly distributed about its axis and are directed axially of the axle shaft and bearing unit, making possible ready removal of the bearing unit with minimum possibility of fracturing any bearing race. Consequently danger of injury from flying fragments of a broken bearing unit is eliminated or greatly reduced. Moreover, since the bearing unit may thus be removed from the axle assembly without damaging it, reuse is possible with consequent substantial savings in repair costs.

The present invention thus provides a tool of specialized geometry which combines high strength and rigidity and relatively light weight, which is simple to operate, and which can be manufactured and sold at moderate cost.

The reaction member has a peripheral reinforcing rib which provides the major strength of the member and efficiently resists the stresses therein. The rib directly carries the oppositely directed lugs by means of which thrust pressures are applied to the member. A relatively thin base portion of the reaction member has a central opening to receive the axle or other centrally located projection of the axle assembly and, disposed in radial relation to such central opening, a plurality of slotted openings adapted to have passed therethrough studs or clamping bolts of various types and sizes of axle assemblies. The reaction member also includes radial reinforcing ribs fixed to the peripheral rib and to the base portion to distribute forces imposed on the member and thereby strengthen the base portion. The height of the peripheral rib is substantially greater than, preferably at least about three times as great as, the thickness of the base portion; these proportions provide the strength and weight advantages mentioned above.

The lifting member comprises a yoke of substantial cross section extending around the major part of and united to the periphery of the working portion of such lifting member, the yoke being discontinuous across the front edge of the working portion. The lifting member has a relatively thin web which constitutes the working portion and provides a working area of substantial extent between the side and rear portions of the yoke. The transverse tapering reinforcing ribs formed on the working portion at the sides thereof and united at their large ends to the sides of the rib in the vicinity of the thrust receiving lugs which are also fixed to the sides of the rib effectively distribute the thrust forces over the entire area of the working portion. The relatively thin web extends across the entire width of the working area at the front edge of the lifting member 2 so as to permit and facilitate the insertion of the web into the narrow clearance space that exists between the closure element 12 and the end plate 8 of the axle assembly. The yoke, together with its associated transverse reinforcing ribs, imparts rigidity and strength to the lifting member because it is generally of greater height than thickness, and because its height is several times the thickness of the web. Preferably, as shown in FIG. 5, the rear portion 25 of the rib 24, which is the deepest portion thereof, has a height above the working surface 28 of the web portion 27 at least about three times the thickness of the web portion 27.

The open ended slot 35 which receives the axle may, by reason of the reinforcement of the web 27 by the generally yoke-shaped peripheral rib 24 and the transverse ribs 33 and 34, have an average width at least about four times the thickness of the web 27 over the working area. Since the yoke-shaped rib 24 is disposed wholly outside the working area of the web 27, there is minimum interference with any of the axle parts in placing or using the device for a bearing removing operation. The device is thus adapted for use in disassembling the axles of many makes and models of vehicles.

The configuration of the slot 35, with a rearward narrow portion terminating in an arcuate end wall and a forward wide portion having confronting arcuate concave walls, with corresponding alternate possible positions of the actuating screws, provides two centers of operation for optional location of the axis of the axle shaft. The several features, in combination, thus provide a device of extreme versatility capable of operating on an extremely wide variety of different types of axle assemblies.

The embodiment described is by way of illustration it being apparent that various changes in structural details may be resorted to without departing from the fundamentals of the invention. It is intended that the patent shall cover, by summarization in the appended claims, all features of patentable novelty residing in the invention.

What I claim and desire to secure by Letters Patent of the United States is:

1. A device for lifting a press fitted bearing off the drive axle of an automobile or the like, said device including a main member comprising a broad, relatively thin and substantially flat body portion for applying a force to such bearing and, surrounding the body portion on three sides, a narrow relatively thick peripheral reinforcing portion, the body portion being formed with a slot opening through its fourth side to receive the axle in engaging the body portion against a bearing to be removed, said reinforcing portion being generally of greater height measured normal to the body portion than thickness measured parallel to the body portion, actuating elements, and the main member including reaction portions mounting the elements on the outside of the reinforcing portion and symmetrically located relative to said reinforcing portion and to the slot to transmit to the reinforcing portion and thence to the body portion forces developed by the actuating elements in reacting against the axle from which such bearing is being removed, said actuating elements each being separated from the body portion by the reinforcing portion, said reaction portions each constituting an outrigger directly connected solely to the outside of the reinforcing portion along a small fractional part of the latter.

2. A device for lifting a press fitted bearing off the drive axle of an automobile or the like, said device including a main member comprising a broad, relatively thin and substantially flat body portion for applying a force to such a bearing and, surrounding the body portion along three edges, a narrow relatively thick peripheral reinforcing portion, the body portion being formed with a slot opening through its fourth edge to receive the axle in engaging the body portion against a bearing to be removed, the slot having a relatively narrow deep portion remote from and a relatively wide portion adjacent said fourth edge, said reinforcing portion being generally of greater height measured normal to the body portion than thickness measured parallel to the body portion, actuating screws, the main member including reaction portions on the outside of the reinforcing portion and symmetrically located relative to said reinforcing portion and to the slot, and said reaction portions being formed with a first pair of threaded sockets located on a line passing through the narrow portion of the slot for mounting the screws in working an axle assembly received in said narrow portion and being formed with a second pair of threaded sockets located on a line passing through the wide portion of the slot and spaced from and parallel to the first line for mounting the screws in working an axle assembly received in said wide portion to transmit to the reinforcing portion and thence to the body portion forces developed by the screws reacting against the axle from which such bearing is being removed.

3. A device for holding a drive axle assembly of the type having at one end a rigidly attached plate normal to the axle axis in removal of a bearing press fitted on the axle, said device comprising a member having a broad, relatively thin and substantially flat base portion engageable with the axle plate and, surrounding the base portion, a narrow, relatively thick peripheral reinforcing portion, the base portion being formed with a relatively large central through opening capable of receiving an axle end portion protruding beyond the plate and with relatively small through openings to receive studs projecting axially from the axle plate, a pair of companion support elements extending downwardly from the peripheral reinforcing portion on diametrically opposite sides of the member, said support elements each having spaced surface portions equidistant from the base portion for engagement with a supporting surface to support the member on the latter with the base portion elevated above such supporting surface in spaced parallel relation, and each having spaced parallel exposed side edges, the side edges of one support element being spaced from one another the same distance as the side edges of the companion element, the device being adapted to be mounted in a bench vise by engaging the vise jaws against such parallel edges simultaneously.

4. A device for holding a drive axle assembly of the type having at one end a rigidly attached plate normal to the axle axis in removal of a bearing press fitted on the axle, said device comprising a member having a broad, relatively thin and substantially flat base portion engageable with the axle plate and, surrounding the base portion, a narrow, relatively thick peripheral reinforcing portion, the base portion being formed with a relatively large central through opening capable of receiving an axle end portion protruding beyond the plate and with relatively small through openings to receive studs projecting axially from the axle plate, a pair of companion support element extending downwardly from the peripheral reinforcing portion on diametrically opposite sides of the member, said support elements each having spaced surface portions equidistant from the base portion for engagement with a supporting surface to support the member on the latter with the base portion elevated above such supporting surface in spaced parallel relation, said elements each having an inwardly directed surface and an outwardly directed surface parallel to one another and to the corresponding surface of the companion element and each element also having spaced parallel exposed side edges, the side edges of one support element being spaced from one another the same distance as the side edges of the companion element, the device being adapted to be mounted in a bench vise by engaging the vise jaws against such parallel edges simultaneously and by engaging the jaws of such vise against the parallel inwardly and outwardly directed surfaces of one of the support elements.

5. A device for holding a drive axle assembly of the type having at one end a rigidly attached plate normal to the axle axis in removal of a bearing press fitted on the axle, said device comprising a member having a broad, relatively thin and substantially flat base portion engageable with the axle plate and, surrounding the base portion, a narrow, relatively thick peripheral reinforcing portion, the base portion being formed with a relatively large central through opening capable of receiving an axle end portion protruding beyond the plate, a plurality of radial reinforcing ribs on the base portion extending substantially between the opening and the reinforcing portion, said ribs being attached at their outer ends directly to the reinforcing portion, each rib being tapered in height with its greatest height at its point of attachment to the reinforcing portion, the base portion being formed with relatively small through openings to receive studs projecting axially from the axle plate, said small openings being circumferentially spaced about the central opening and located between the ribs and between the central opening and the reinforcing portion, a pair of companion support elements extending downwardly from the peripheral reinforcing portion on diametrically opposite sides of the member, and said support elements each having spaced surface portions equidistant from the base portion for engagement with a supporting surface to support the member on the latter with the base portion elevated above such supporting surface in spaced parallel relation.

6. A device for holding a drive axle assembly of the type having at one end a rigidly attached plate normal to the axle axis in removal of a bearing press fitted on the axle, said device comprising a member having a broad, relatively thin and substantially flat base portion engageable with the axle plate and, surrounding the base portion, a narrow, relatively thick peripheral reinforcing portion, the base portion being formed with a relatively large central through opening capable of receiving an axle end portion protruding beyond the plate, a plurality of radial reinforcing ribs on the base portion extending substantially between the opening and the reinforcing portion, said ribs being attached at their outer ends directly to the reinforcing portion, each rib being tapered in height with its greatest height at its point of attachment to the reinforcing portion, the base portion being formed with relatively small through openings to receive studs projecting axially from the axle plate,
said small openings being circumferentially spaced about the central opening and located between the ribs and between the central opening and the reinforcing portion,
a pair of companion support elements extending downwardly from the peripheral reinforcing portion on diametrically opposite sides of the member, and
said support elements each having spaced surface portions equidistant from the base portion for engagement with a supporting surface to support the member on the latter with the base portion elevated above such supporting surface in spaced parallel relation,
said elements each having an inwardly directed surface and an outwardly directed surface parallel to one another and to the corresponding surface of the companion element,
and the device being adapted to be mounted in a bench vise by engaging the jaws of such vise against the parallel inwardly and outwardly directed surfaces of one of the support elements and also by engaging such jaws against the outwardly directed surfaces of both support elements.

References Cited in the file of this patent

UNITED STATES PATENTS

| | | |
|---|---|---|
| 527,731 | Sheridan | Oct. 16, 1894 |
| 716,368 | Bement et al. | Dec. 23, 1902 |
| 1,326,426 | Shea | Dec. 30, 1919 |
| 1,443,052 | Stephens | Jan. 23, 1923 |
| 1,861,079 | Bynum | May 31, 1932 |
| 1,930,690 | Oelkers | Oct. 17, 1933 |
| 2,230,918 | Walter | Feb. 4, 1941 |
| 2,253,411 | Thompson | Aug. 19, 1941 |

FOREIGN PATENTS

| | | |
|---|---|---|
| 123,828 | Australia | Mar. 13, 1947 |
| 623,558 | France | Mar. 21, 1927 |
| 653,083 | France | Oct. 30, 1928 |